United States Patent [19]

Bunton

[11] Patent Number: 4,667,652
[45] Date of Patent: May 26, 1987

[54] OUTDOOR GRILL

[75] Inventor: Michael W. Bunton, Mississauga, Canada

[73] Assignee: Sunbeam Corp. Ltd., Toronto, Canada

[21] Appl. No.: 907,450

[22] Filed: Sep. 15, 1986

[51] Int. Cl.$^4$ .............................................. A47J 37/00
[52] U.S. Cl. ................................... 126/25 R; 126/9 B; 126/41 R; 126/332; 99/450
[58] Field of Search .................... 126/9 R, 9 B, 25 R, 126/41 R, 332, 334, 335, 337, 338; 99/385, 393, 401, 448, 450; 312/273, 274

[56] References Cited

U.S. PATENT DOCUMENTS

| | | | |
|---|---|---|---|
| 3,085,562 | 4/1963 | Persinger et al. | 126/25 R |
| 3,520,290 | 7/1970 | Winters | 126/25 R |
| 3,938,493 | 2/1976 | Bauer | 126/41 R |

Primary Examiner—Margaret A. Focarino
Attorney, Agent, or Firm—Neil M. Rose

[57] ABSTRACT

An outdoor grilling appliance having a retractable shelf for keeping food warm within the cooking area and above the normal food grilling surface with means interconnecting the keep-warm shelf with the cover of the grill so that upon opening the grill the keep-warm shelf is displaced laterally and partially retracted from above the grilling surface.

9 Claims, 6 Drawing Figures

OUTDOOR GRILL

BACKGROUND OF THE INVENTION

This invention relates to outdoor cooking grills and more particularly to a grill having a simple and effective keep-warm shelf associated with the grill.

Outdoor grills, or barbecue grills as they are sometimes called, normally include a lower housing or firebox in which either charcoal or a gas burner is disposed. A grilling surface is positioned above the charcoal or burner near the top opening in the lower housing or firebox. Hingeably connected to the lower housing is a cover or upper housing which is movable between a retracted position in which it extends generally vertically and a closed position in which it covers the grilling surface and tends to confine heat and smoke in the area in which the food is being cooked on the grill.

There are many instances in which it is desirable to either keep warm previously cooked food or heat food with a lower level of heat than would be obtained on the normal grilling surface of the outdoor grill. In such cases there have been secondary shelves or supports provided which are more remote from the charcoal or gas burner and, therefore, are not subjected to as much heat as the grilling surface itself. Examples of prior art grills having such keep-warm shelves or trays are Winters U.S. Pat. No. 3,520,290 and Bauer U.S. Pat. No. 3,938,493. In the Bauer patent the keep-warm shelf or grate 14 is fixedly located and is positioned rearwardly of the grilling surface or grill grate 13. In such an arrangement, the keep-warm shelf takes up additional space and results in a more cumbersome grill than one without such a keep-warm shelf.

The Winters U.S. Pat. No. 3,520,290 on the other hand has a shelf 29 which is supported by a parallel linkage so that it moves from a position immediately above the grilling surface as shown in FIG. 4 to a retracted position further elevated above the lower housing and retracted to the rear as shown in FIG. 2. Both of these prior art devices are relatively complex and add substantially to the cost of the grill for a feature which is of somewhat limited interest to the user.

SUMMARY OF THE INVENTION

The present invention provides a simplified warming rack which may easily be assembled to the housing of the outdoor grill and which automatically moves from a position over the grilling surface to a retracted position as the cover to the outdoor grill is pivoted to its open position.

It is an object of the present invention to provide an improved keep-warm shelf for an outdoor barbecue grill.

It is a further object of the present invention to provide a simplified keep-warm shelf which is secured to the cover of a barbecue grill by a simple detachable, pivotal connection.

It is another object of the present invention to provide a simple and effective keep-warm shelf for a barbecue grill which is pivotally connected to the cover of the grill, which withdraws automatically from above the grilling surface as the cover is moved from the closed to the open position and which can additionally be pivoted to a nonuse position where it is completely withdrawn into the cover of the outdoor grill.

Further objects and advantages will become apparent as the following description proceeds and the features of novelty which characterize the invention will be pointed out in the claims annexed to and forming a part of the specification.

BRIEF DESCRIPTION OF THE DRAWINGS

Referring to FIG. 1 of the drawings, there is shown an outdoor cooking grill which is designated generally by reference numeral 11. The grill may be heated by either charcoal or a gas burner which would be located in a lower housing or firebox 13 which has a generally horizontal bottom wall 13a, a front wall 13b, rear wall 13c and side walls 13d, one of the side walls 13d being shown in FIG. 1. Located at the upper rear portion of the lower housing 13 are brackets 15 which pivotally connect an upper housing 17 to the lower housing 13. The upper housing 17 rotates about a generally horizontal axis 18 between a closed position as shown in FIG. 1 and an open position as shown in FIG. 2. The center of gravity of the upper housing 17 moves beyond the axis 18 of the pivotal connection between the upper housing 17 and the brackets 15 so that the upper housing or cover will remain in its open position when manually moved there. Typically, the firebox or lower housing 13 and the upper housing or cover 17 may be made of sheet metal or cast aluminum to make it more durable and resistant to rust. Positioned within the upper portion of the lower housing 13 is a typical and well known grill surface or member 19 shown in dotted lines in FIG. 2. The grill member 19 is typically made of a series of spaced rods or bars which are welded together to form an open grilling surface on which the food to be cooked is supported above the charcoal or heat storage means which might be heated by gas burners.

During the use of the typical outdoor cooking grill, it is often desirable to have an area adjacent to the grill member on which already cooked food or bread, rolls or the like, may be stored where they will be kept warm or warmed up to a lesser degree than the food being cooked on the grilling surface. It is important that the keep-warm or storage tray not interfere with the placement and removal of food on the grilling surface itself. My invention includes a keep-warm or food storage shelf 21 which is easily assembled to the cooking grill 11 and which automatically moves from a position overlying the grilling surface 19 to a somewhat retracted position in which only a portion of the shelf 21 overlies the grilling surface 19. Referring to FIG. 4, the shelf 21 is formed of a plurality of metal bars 23 which are parallel and spaced from one another and are interconnected by transversely extending rods 25, 27 and 29. In addition, the shelf 21 has extending along one edge thereof a hinge rod 31 which has on its outer ends retaining projections 31a as is best shown in FIGS. 5 and 6.

The purpose of the hinge rod 31 is to pivotally connect the shelf 21 to the upper housing or cover 17. As shown in FIGS. 1, 2, and 3, the cover 17 is formed with side walls 17a which are generally parallel to each other and positioned on opposite sides of the grill member 19. In the rear portion of the cover 17 as shown in FIG. 1, the side walls 17a are formed with slots 17b which extend at about a 45° angle to the horizontal when the cover 17 is in its closed position as shown in FIG. 1. The purpose of the slots 17b are to receive the projections 31a in order that the hinge rod 31 may be assembled to the cover 17. By suitably orienting the shelf 21 with respect to the cover 17, the ends of the rod 31 may be inserted through the slots 17b so that the rod 31 rests in the position shown in the drawings with the rod 31 at the lower end of each of the slots 17b. In normal usage, the force of gravity holds the rod 31 downwardly in the slots 17b which simply serve to pivotally interconnect the shelf 21 and the cover 17.

Figure 1:
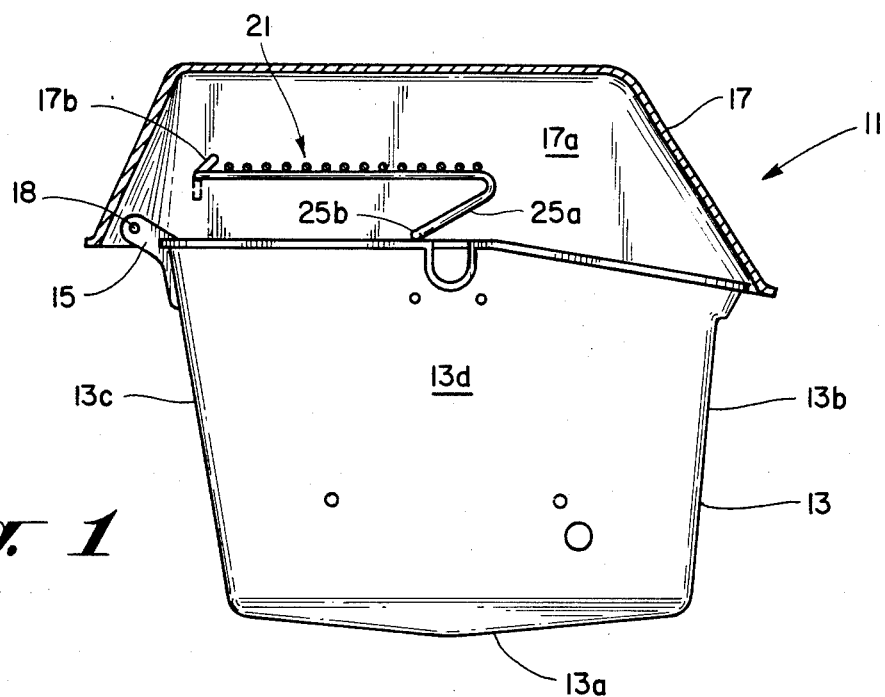
FIG. 1 is a side elevational view of an outdoor cooking grill or barbecue with a section of the cover cut away to expose the keep-warm shelf in accordance with the present invention.
Figure 2:
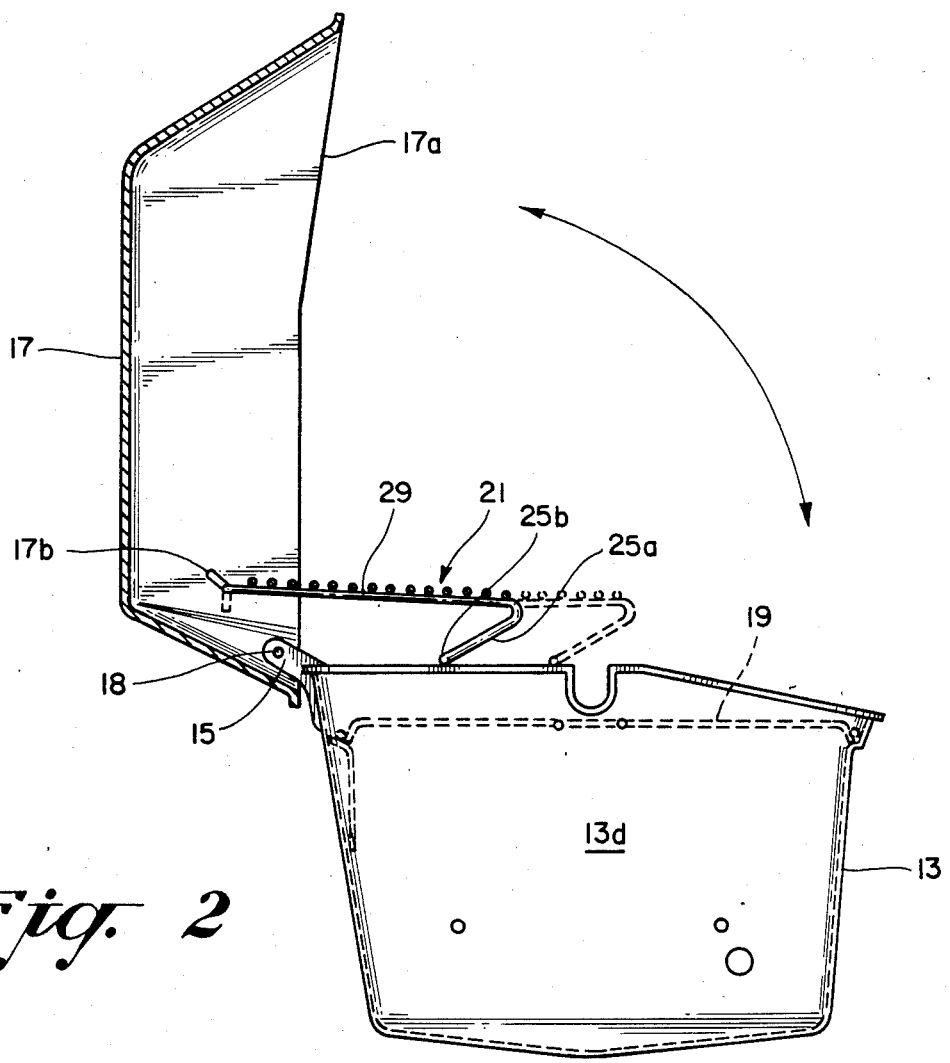
FIG. 2 is a side elevational view similar to FIG. 1 but showing the cover of the grill in its raised or open position.
Figure 5:
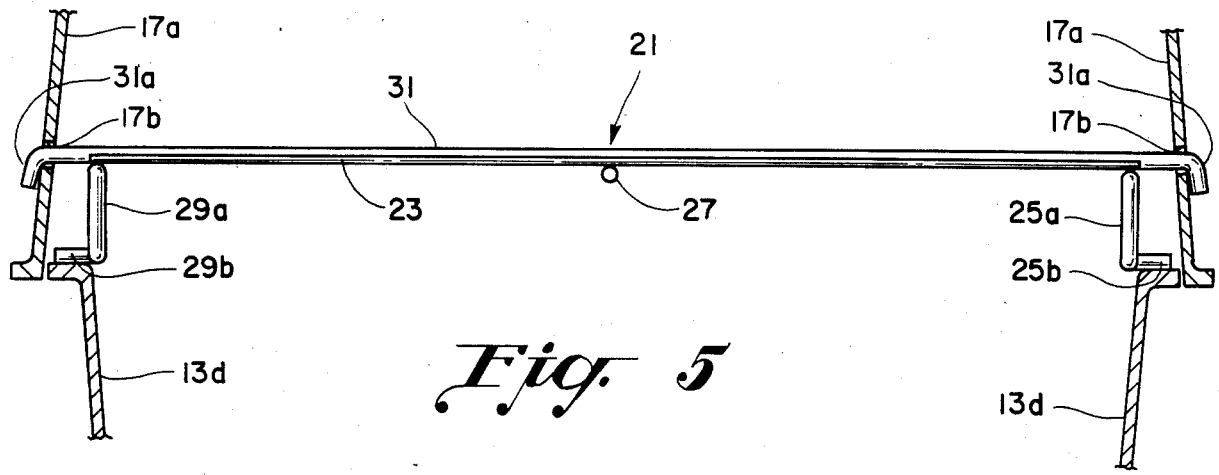
FIG. 5 is a front elevational view of the keep-warm shelf of FIG. 4 and including fragmentary sectional showings of portions of the grill housing that engage the keep-warm shelf.
Figure 6:
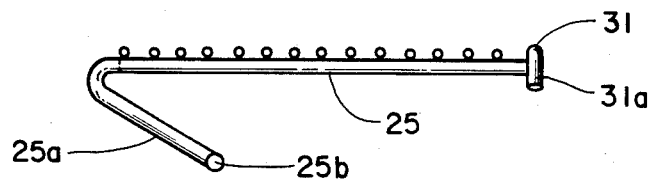
FIG. 6 is a side elevational view of the keep-warm shelf shown in FIGS. 4 and 5.

To support the shelf 21 at the end remote from the rod 31, the interconnecting rods 25 and 29 located on the outer edges of the shelf 21 are formed with angled supports 25b and 29a, respectively. At their lower ends, the supports 25a and 29a are formed with outwardly extending projections 25b and 29b which projections engage the upper edges of the walls 13d as best shown in FIGS. 1, 2 and 5. The top edges of the walls 13d are substantially horizontal and smooth so that the projections 25b and 29b may readily slide in engagement therewith. This sliding action occurs when the cover 17 and the shelf 21 move from the position shown in FIG. 1 to the position shown in FIG. 2. The fact that the pivotal connection between the rod 31 and the cover 17 is offset from the pivotal connection between the cover 17 and the brackets 15 results in the shelf 21 being displaced to the left from the position shown in FIG. 1 to the position shown in FIG. 2. As a consequence, the shelf 21 is withdrawn sufficiently from its position completely overlying the grilling surface 19 to a position in which it is partly retracted from this overlying position permitting the user to have better access to the food being cooked on the grilling surface 19.

Figure 3:
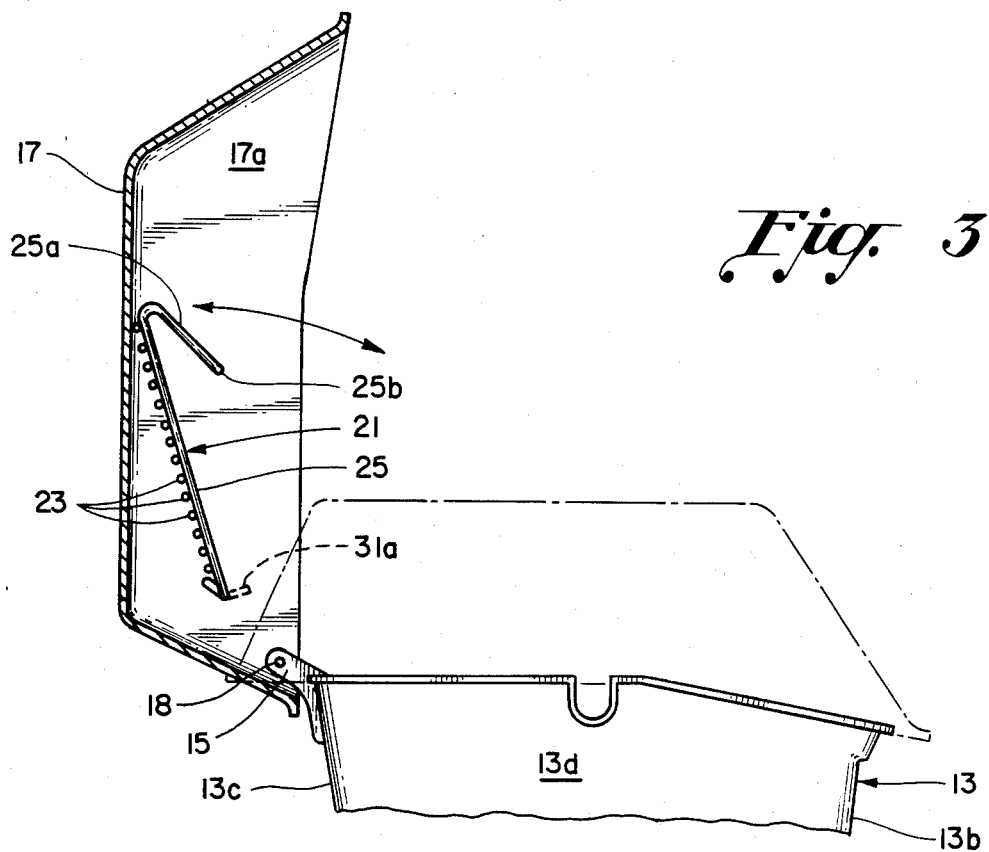
FIG. 3 is a side elevational view similar to FIG. 2 but showing the keep-warm shelf in its retracted or withdrawn position and showing a portion of the lower housing of the grill cut away.
Figure 4:
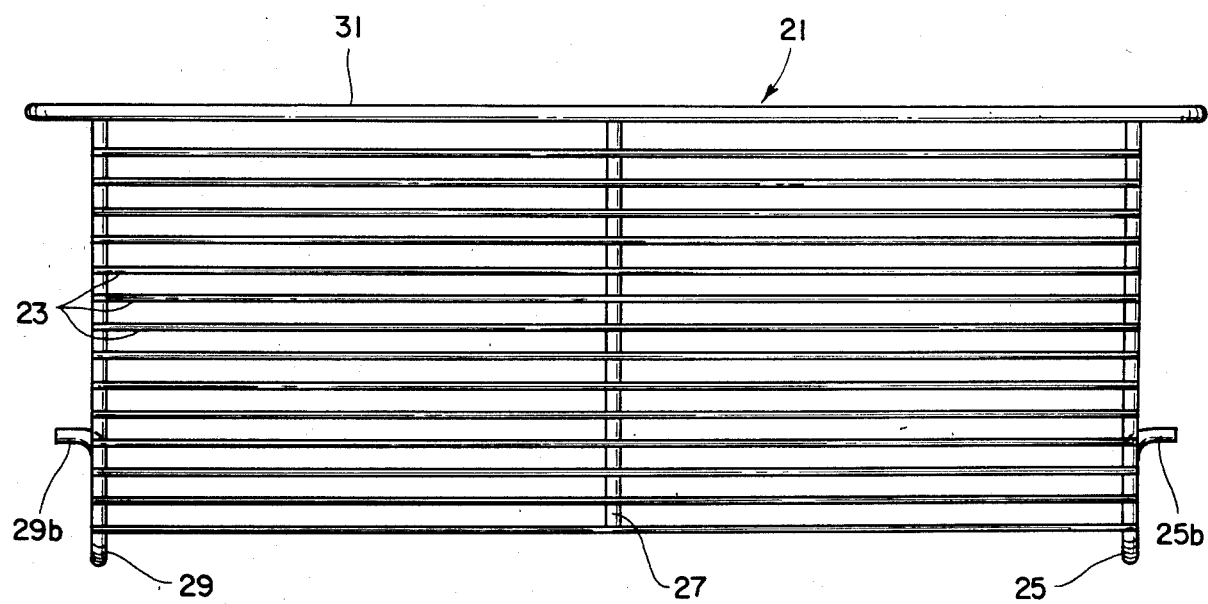
FIG. 4 is an enlarged top plan view of the keep-warm shelf embodied in my invention.

In some instances it may be desirable to completely withdraw the shelf 21 from above the grill member 19. If this is desired, the shelf 21 may be manually pivoted to the position shown in FIG. 3. The center of gravity of the shelf 21 is moved beyond the pivot axis 18 between the rod 31 and the cover 17 causing the force of gravity to bias the shelf 21 in a counterclockwise direction as seen in FIG. 3 against the top of the cover 17. Once the food has been removed from the grill member 19, the shelf 21 may easily be pivoted back to the position shown in FIG. 2.

Thus, there has been described a very simple and useful keep-warm or food storage shelf 21 which may be easily assembled to and disassembled from the grill 11, making it easy to remove for cleaning purposes. In addition, the shelf 21 represents a very inexpensive addition to the grill 11 requiring only the slots 17b be provided in the cover 17 and including the cost of the simple shelf 21 with its rods 23 and interconnecting supports 25, 27 and 29. The simplicity of the shelf 21 and its assembly make it a useful alternative accessory to provide for an outdoor cooking grill.

What is claimed as new and desired to be secured by Letters Patent of the United States is:

1. An outdoor grill comprising a lower housing which supports a flat grill member over a firebox area and an upper housing which is pivotally connected to the lower housing so that it may be rotated about a first horizontal axis between a closed position overlying said grill member and an open position in which said grill member is completely exposed, a generally rectangular food warming support having a flat surface with a first edge mounting a pair of trunnions which connect said support to pivot directly in said upper housing on a second horizontal axis spaced from said first horizontal axis, said second horizontal axis being fixed with respect to said upper housing, said trunnions being fixed with respect to said food warming support and engaged directly with said upper housing, said support having support means extending into sliding engagement with said lower housing, said support being positioned in spaced parallel relation to and overlying said grill member when said upper housing is in said closed position, said support being displaced laterally to a withdrawn position when said upper housing is moved to said open position.

2. An outdoor grill comprising a lower housing which supports a flat grill member over a firebox area and an upper housing which is pivotally connected to the lower housing so that it may be rotated about a first horizontal axis between a closed position overlying said grill member and an open position in which said grill member is completely exposed, a generally rectangular food warming support having a flat surface with a first edge mounting a pair of trunnions which pivotally connect said support to said upper housing on a second horizontal axis spaced from said first horizontal axis, said support having support means extending into sliding engagement with said lower housing, said support being positioned in spaced parallel relation to and overlying said grill member when said upper housing is in said closed position, said support being displaced laterally to a withdrawn position when said upper housing is moved to said open position, said warming support being formed by a plurality of spaced parallel rods with one of said rods having ends which form said trunnions, said rod ends extending through spaced openings in said upper housing.

3. The combination of claim 2 wherein said rod ends have retaining projections which extend radially of said second axis to prevent axial displacement of said one rod with respect to said upper housing.

4. The combination of claim 3 wherein said spaced openings comprise slots which are longer than said retaining projections.

5. The combination of claim 1 wherein said food warming support and said second axis are so positioned that when said upper housing is in said open position said food warming support may be rotated about said second axis more than 90° from a horizontal position partially overlying said grill member to a retracted position completely within said upper housing.

6. An outdoor grill comprising an upper housing and a lower housing which, in a closed position, abut along a generally horizontal plane to form an enclosure within which food may be grilled on a grilling surface, said grilling surface being disposed horizontally within said lower housing below said generally horizontal plane, said upper and lower housings being pivotally connected on a first horizontal axis extending along adjacent edges, said upper housing being supported to rotate from said closed position overlying said grilling surface to an open position in which said upper housing is displaced from above said grilling surface, a flat warming shelf mounted within said upper housing in a horizontal position when said upper housing is in said closed position, said warming shelf having a front edge which is supported for movement in a horizontal direction by sliding engagement between said shelf and said lower housing and a rear edge which is pivotally mounted in said upper housing for relative rotation about a second horizontal axis which is displaced from said first horizontal axis and fixed with respect to said upper housing, said warming shelf being displaced laterally in the same horizontal plane as it occupied in the closed position of said upper housing and partially withdrawn from overlying said grilling surface when said upper housing is rotated from said closed to said open position.

7. An outdoor grill comprising an upper housing and a lower housing which, in a closed position, abut along a generally horizontal plane to form an enclosure within which food may be grilled on a grilling surface, said grilling surface being disposed horizontally within said lower housing below said generally horizontal plane, said upper and lower housings being pivotally connected on a first horizontal axis extending along adjacent edges, said upper housing being supported to rotate from said closed-position overlying said grilling surface to an open position in which said upper housing is displaced from above said grilling surface, a flat warming shelf mounted within said upper housing in a horizontal position when said upper housing is in said closed position, said warming shelf having a front edge which is supported for horizontal movement by said lower housing and a rear edge which is pivotally connected to said upper housing for relative rotation about a second horizontal axis which is displaced from said first horizontal axis, said warming shelf being displaced laterally and partially withdrawn from overlying said grilling surface when said upper housing is rotated from said closed to said open position, said shelf including a bar extending along one edge thereof, said bar having trunnion portions at its ends, said upper housing having spaced parallel wall portions which have aligned openings receiving the trunnion portions of said bar to pivotally interconnect said shelf and said upper housing.

8. The combination of claim 7 wherein said bar includes radial projections at its outer ends, which projections are disposed outside of said enclosure and said spaced wall portions to restrain said bar from axial movement with respect to said upper housing.

9. The combination of claim 8 wherein said warming shelf is formed with a pair of spaced supports extending downwardly from said front edge of said shelf into sliding engagement with horizontal edges formed on said lower housing.

* * * * *